United States Patent [19]

Appel et al.

[11] Patent Number: 4,751,953

[45] Date of Patent: Jun. 21, 1988

[54] LATERAL PULL ROLL-UP BLIND

[75] Inventors: Hans Appel; Hermann Heidenescher, both of Melle, Fed. Rep. of Germany

[73] Assignee: Zündwarenfabrik Starcke GmbH & Co., Melle, Fed. Rep. of Germany

[21] Appl. No.: 914,476

[22] Filed: Oct. 2, 1986

[30] Foreign Application Priority Data

Oct. 10, 1985 [DE] Fed. Rep. of Germany ....... 3536160

[51] Int. Cl.[4] ............................................ E06B 9/208
[52] U.S. Cl. .................................... 160/313; 160/321; 160/323.1
[58] Field of Search ................... 160/313–326

[56] References Cited

U.S. PATENT DOCUMENTS

| 519,414 | 5/1894 | Sturgiss | 160/324 X |
|---|---|---|---|
| 1,806,650 | 5/1931 | Schmelz | 160/298 |
| 2,012,261 | 8/1935 | Drumm | 160/314 X |
| 4,223,714 | 9/1980 | Weinreich | 160/319 X |
| 4,424,851 | 1/1984 | Kohayakawa | 160/320 |
| 4,475,580 | 10/1984 | Hennequin | 160/321 |
| 4,487,245 | 12/1984 | Shinohana et al. | 160/313 |
| 4,519,487 | 5/1985 | Florin | 160/319 X |

Primary Examiner—J. Franklin Foss
Assistant Examiner—Robert A. Olson
Attorney, Agent, or Firm—Erwin S. Teltscher

[57] ABSTRACT

A lateral pull roll-up blind includes a drive housing member which is provided with lateral connecting elements which are situated within the outline of the driving wheel. These connecting elements, as well as compatible connecting elements of a carrier are distributed along a distribution circle in a distributing pattern rendering multiple angular repositioning of the housing member relative to the carrier possible. Even the other end of the lateral pull roll-up blind and the corresponding carrier are constructed in the same manner. The housing member is provided with a hollow pin on which there is mounted a clamping winding spring, while an entraining disc serving for the rotational entrainment of the associated end of the take-up shaft is rotatably mounted in the pin of the housing member. The entraining disc is drivingly connected with the driving wheel through actuating portions of the clamping winding spring.

13 Claims, 4 Drawing Sheets

LATERAL PULL ROLL-UP BLIND

BACKGROUND OF THE INVENTION

The present invention relates to roll-up blinds or shades in general, and more particularly to a lateral pull roll-up blind or shade.

Various constructions of lateral pull roll-up blinds or shades are already known and in widespread use. For the sake of simplicity, reference will be had herein only to roll-up blinds, but it is to be understood that the present invention may also be employed in connection with roll-up shades and similar arrangements. Among the known roll-up blind constructions, there are such which include two carriers, a take-up shaft, an aperture member supporting one end of the take-up shaft and positionally fixable on one of the carriers, a drive including a driving wheel and an elongated pulling element trained about the driving wheel, plug-in entrainment elements which connect the driving wheel with the take-up shaft for joint rotation, a clamping arrangement which can be released by pulling on the pulling element, and a housing having an outlet opening for the pulling element and fixedly mountable on the other of the carriers.

A lateral pull roll-up blind of the above type is known, for instance, from the European patent application EP-A-No. 0086000. While it is true that this blind exhibits a sufficiently satisfactory operational performance while it simultaneously achieved a simple structure consisting of only a few parts, this is achieved only by the acceptance of substantial drawbacks. So, the clamping arrangement utilized in this known blind is constituted by a clamping shuttle which is movably supported in a chamber of the drive housing and through which there are guided the two runs of a pulling rope which is trained about a driving wheel that is accommodated in the drive housing. This has for its consequence that a chain drive consisting of a chain sprocket and a bead string, which is to be preferred in many instances for optical and functional reasons, cannot be used in this arrangement in view of the use of this particular kind of a clamping arrangement.

With a view to an optically appealing appearance, a quite high-weight rope tensioning member is typically being used in connection with the pulling rope, this tensioning member being hanged into the rope. The use of such a rope tensioning member is problematical when using the aforementioned clamping arrangement, inasmuch as there exists the possibility of an untimely loosening of the clamping.

While it is true that in this construction the take-up shaft, on the one hand, the drive, on the other hand, and the associated carrier are respectively complete operational elements in themselves, it is also true that in this known construction the connecting elements on the drive housing first of all, are situated outwardly of the circumference of the driving wheel and, secondly, are simply provided only in such a form that the drive can be mounted by means of its housing only in one spatial position on its carrier. Yet, there exists the desire on the part of the user for an arbitrary usability of one and the same system, that is, the possibility of mounting the blind on a wall or on the ceiling as well as in a niche, and also the possibility of arranging the drive at the right or at the left. The projection of the connecting elements, which in this construction also hold the two halves of the housing together, outwardly of the circumference of the driving wheel leads, considering the limited total amount of space which is available in systems of this kind for the drive and its housing, to a considerable dimensional buildup. As a result of this, but also in view of the quite weak clamping shuttle, an arrangement of this type can be used only for light and small roll-up blinds and, for this reason as well, the requirement for a highest possible degree of universality of use of such a system is not satisfied.

In another lateral pull roll-up blind of a similar construction, which is known from the German patent application DE-A-No. 3211506, while there is provided a clamping arrangement in which a stationary pin is surrounded by a clamping winding spring which is actuatable by the driving wheel of the drive, and while a chain sprocket cooperating with a bead string may be utilized in this construction, still the actual drive has a complicated construction which consists of a multitude of parts and, moreover, no actual housing is provided in this construction for the drive. Rather, the respective carrier is configured in a housing-like fashion. This structural and functional combination of the drive and of the carrier results only seemingly in a simplification of the construction. Yet in reality, with respect to the two ends of the roll-up blind, there results from this particular design approach a great number of various parts and, above all, the user is limited from the very outset by the required outlet opening in one circumferential or jacket wall of the carrier for the passage of the pulling element therethrough, with respect to the universal mounting possibility of the system, to a single possibility. The carrier can be utilized in this manner only at the right side or on the left side, depending on the chosen layout. Furthermore, also depending on the chosen layout, the carrier can be utilized only in a certain predetermined position, for instance, as a wall-mounted carrier. Herein, the support of the take-up shaft is also provided in such a manner that the take-up shaft can be introduced, for all intents and purposes, only from above. This means that a sufficient amount of free space must be left available in the upward direction in a system of this type so that, in the case of need, mounting of the system closely underneath a ceiling or another horizontal upwardly delimiting surface is not possible.

The conditions are similar in another lateral pull roll-up blind of the prior art which is known from the U.S. Pat. No. 4,424,851. In this construction, the driving transmission has an especially complicated construction which consists of a large number of different individual parts, yet the result is a reliable clamping of even relatively large roll-up blinds. Even here, there is not obtained a complete functional separation of the carrier and of the drive so that, once more, only the very limited utilization of the system for two predetermined cases of use, for example, as a wall carrier or as a ceiling carrier, results from this design, in conjunction with the connecting elements which are provided for use in only two positions.

In view of the fact that in this construction the drive is arranged at the exterior of the carrier, the mounting of the system in a niche is here impossible to begin with. The support for the roll-up blind is so constructed in this arrangement that mounting and dismounting is impossible without loosening and/or tightening connecting screws of at least one carrier.

SUMMARY OF THE INVENTION

Accordingly, it is a general object of the present invention to avoid the disadvantages of the prior art.

More particularly, it is an object of the present invention to provide a lateral pull roll-up blind arrangement which does not possess the drawbacks of the known arrangements of this type.

Still another object of the present invention is to devise a lateral pull roll-up blind arrangement of the type here under consideration which has a universal applicability.

It is yet another object of the present invention to design the above arrangement in such a manner as to include only a minimum number of interchangeably connectable parts.

A concomitant object of the present invention is so to construct the arrangement of the above type as to be relatively simple in construction, inexpensive to manufacture, easy to use, and yet reliable in operation.

In keeping with these objects and others which will become apparent hereafter, one feature of the present invention resides in a lateral pull roll-up blind which comprises two carriers; a take-up shaft; a drive including a driving wheel, and an elongated pulling element trained about the driving wheel; a housing member having an internal space for receiving the driving wheel, an outlet opening for the passage of the pulling element, an end face facing in one direction and a pin extending from the remainder of the housing oppositely to the one direction; an aperture member supporting one end of the take-up shaft and also having an end face; means for respectively fixedly mounting one and the other of the housing and aperture members on one and the other of the carriers, including first connecting formations provided at the end faces of the members, and second connecting formations compatibly engageable with the first connecting formations and provided at the carriers, the first and second connecting formations being distributed at equal angular distances each along a respective distribution circle which is commensurate with the other distribution circles and at the housing member is situated within the outline of the driving wheel for connecting the members with the carriers against angular displacement relative thereto about the axis of the respective distribution circles in a number of different angular positions correspondingly to the distribution of the connecting formations; clamping means releasable by pulling on the pulling element and including a clamping winding spring arranged around the pin of the housing to releasably engage the same and having actuating portions; and plug-in entrainment means for connecting the driving wheel with the take-up shaft, including an entraining disc connected to the other end of the take-up shaft for joint rotation, rotatably mounted on the pin of the housing, and drivingly connected with the driving wheel through the actuating portions of the spring.

Owing to this particular construction, two identical carriers can be used. As a result, it is possible to arrange the drive without difficulty either at the right or at the left. Moreover, it is possible to arrange the drive and the associated carrier in various angularly displaced positions with respect to one another so that, accordingly, the outlet opening for the passage of the the pulling element through the housing of the drive can always be put into the desired position and, consequently, mounting of the roll-up blind at a wall, at a ceiling or in a niche is possible without running into any problems while using one and the same system. Due to the mounting of the clamping winding spring within the drive housing which carries the pin, as well as the mounting of the entraining disc on the pin, the very few required parts of the drive can be brought together in a very compact manner and in a minimum amount of space. Nevertheless, so much available space remains free, for instance, for the diameter and the number of convolutions of the clamping winding spring that this system is equally suited for light as well as for heavy roll-up blinds. The separation of functions renders it possible to use take-up shafts of wood as well as of metal. Furthermore, as a result of the function separation, even take-up shafts of considerably differing diameters can be utilized. Owing to the design of the system of the present invention, the driving wheel can be constructed without problem as a chain sprocket which cooperates with a bead string or chain. However, if so desired, the arrangement of the present invention may also utilize a rope pulley cooperating with an associated pulling rope. Then, the pulling rope may be provided with a rope tensioner.

It is advantageous when the pin of the housing bounds an internal bore and when the entraining disc has a disc portion and a bearing pin which rotatably mounts the disc portion in the bore of the pin of the housing and which is constituted by a plurality of individual segments that have free ends remote from the disc portion and provided with respective bulges for snap-action arresting in the pin of the housing. The entraining means may advantageously further include an entraining member secured to the other end of the take-up shaft and having at least a portion with a non-circular cross section; in this case, the bearing pin of the entraining member bounds an internal passage having a non-circular cross section corresponding to that of the aforementioned portion of the entraining member for receiving the latter. In this connection, it is also advantageous when the entraining member has an end surface which faces the one end of the take-up shaft, and a toothing on the end surface which engages in the one end of the take-up shaft.

According to another advantageous aspect of the present invention, the clamping winding spring has a coil portion having two ends each carrying one of the actuating portions, the entraining disc includes a bearing ring which carries the driving wheel, surrounds the coil portion of the spring, and has a segment-shaped notch delimited by two abutment surfaces which delimit respective interspaces with the abutment surfaces, the driving wheel has a segment-shaped projection which is received in the notch of the bearing ring and has two delimiting faces which are circumferentially spaced from one another by a distance smaller than the corresponding circumferential distance separating the abutment surfaces of the bearing ring, and each of the actuating portions of the spring extends into a different one of the interspaces.

In accordance with another advantageous concept of the present invention, the lateral pull roll-up blind further comprises an end pin secured to the one end of the take-up shaft, and the aperture member has a circumferential surface, and a side which faces toward the take-up shaft in the mounted position of the latter and is provided for the mounting and dismounting of the end pin with a substantially centrally situated bearing bore for the end pin, two inclined slots which extend from the circumferential surface toward and merge with each other at a centrally located merger region radially offset from the bearing bore, and a radial slot extending from the merger region to the bearing bore. Advantageously, the aperture member further includes a retaining bead in the radial slot for retaining the end pin in the bearing bore.

It is particularly advantageous when the equal angular distances between the first and second connecting formations which are provided along the respective distribution circles on the housing and aperture members and on the carriers, respectively, amount substantially to 90°. According to another facet of the present invention, the carriers have respective carrier flanges, the first connecting formations are constituted by plug-in arresting pins provided externally on the housing and aperture members, and the second connecting formations are constituted by arresting recesses provided in the carrier flanges of the carriers. Advantageously, the carriers further have respective foot flanges having elongated slots for the reception of respective stems of mounting screws, and countersinks at the slots for receiving respective heads of the mounting screws. The carrier flanges may have respective central mounting openings, and there may be provided respective lids for closing the openings. A particularly simple and otherwise advantageous construction is obtained when the first connecting formations are constituted by hollow plug-in arresting pins provided externally on the housing and aperture members, when the second connecting formations are constituted by through arresting recesses provided in the carrier flanges of the carriers, and when the lids have respective plug-in pins which are received in the hollow plug-in arresting pins of the housing and aperture members.

A particular advantage of the lateral pull roll-up blind arrangement of the present invention is that it is universally usable. The additional features of the present invention as recited above contribute to the simplicity of the construction of the arrangement, to the ease of mounting and dismounting, as well as to the esthetically appealing compact structural form.

BRIEF DESCRIPTION OF THE DRAWING

The present invention will be described below in more detail with reference to the accompanying drawing in which:

FIG. 6 is an end view of the assembled drive in part-section.

DETAILED DESCRIPTION OF THE PREFERRED EMBODIMENT

Figure 1:
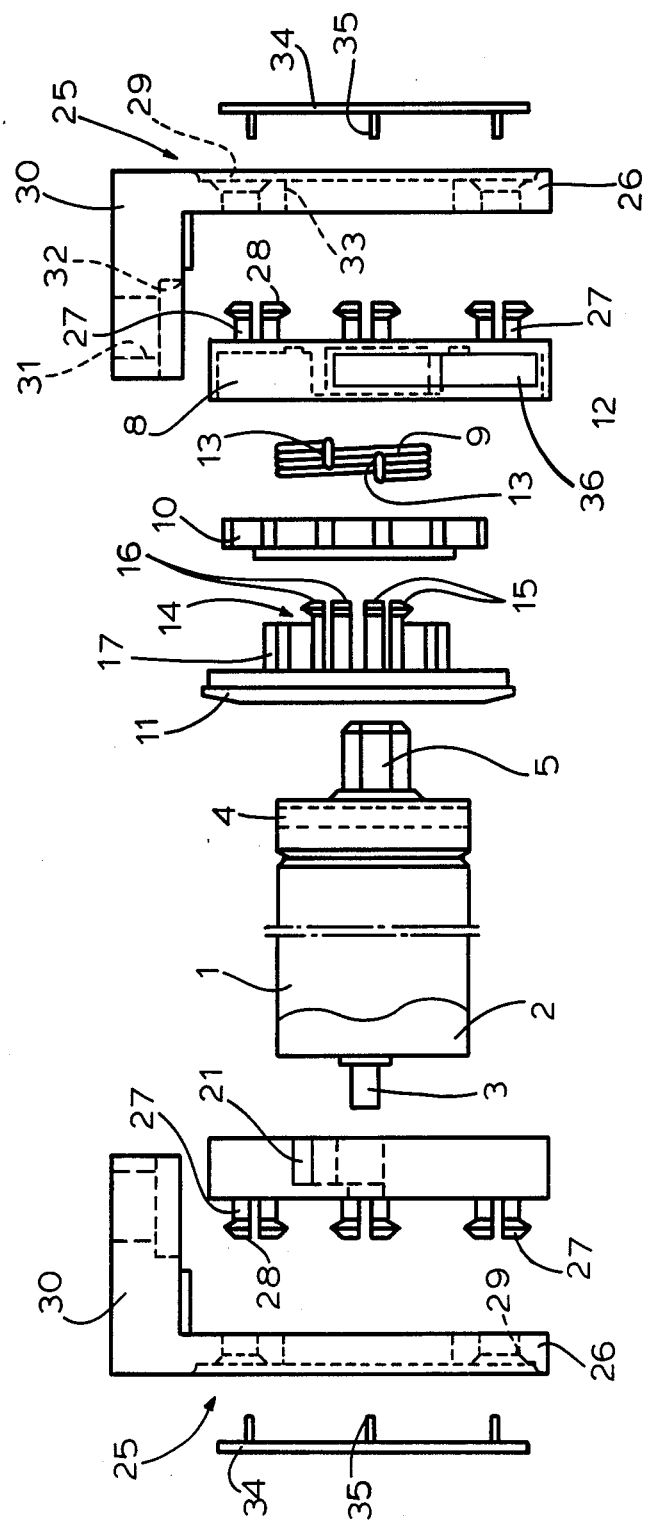
FIG. 1 is an exploded somewhat diagrammatic side elevational view of various components together constituting the lateral pull roll-up blind of the present invention.

Referring now to the drawing in detail, and first to FIG. 1 thereof, it may be seen that the reference numeral 1 has been used therein to identify a take-up shaft of a lateral pull roll-up blind. In the illustrated structure, the take-up shaft 1 is constructed as a cross-sectionally circular rod which does not have any internal bore and which is made, for example, of wood. An end pin 3 is secured in one of the ends of the takeup shaft 1 by means of an end cap 2. In the illustrated construction of the lateral pull roll-up blind, an entraining member 5 is secured in the other end of the take-up shaft 1 by means of a ferrule 4. The entraining member 5 constitutes a part of a plug-in rotational entrainment connection and, to this end, it has a non-circular, for example hexagonal, cross section. As may be seen particularly in FIG. 2 of the drawing, the entraining member 5 is provided at its end which faces the take-up shaft 1 with a toothed formation 6, by means of which it is able to become anchored at the end face of the wooden take-up shaft 1.

In a deviation from the illustrated construction of the lateral pull roll-up blind, there can also be used a take-up shaft 1 in the form of a metallic tube instead of the wooden take-up shaft 1. Under these circumstances, bushings or wooden plugs are inserted in the respective ends of the metallic tube, and the same end pin 3 and entraining member 5 can then be secured again in these bushings or plugs.

The end of the take-up shaft 1 which is provided with the end pin 3 is rotatably supported in an aperture member 7, while the entraining member 5 which is arranged at the other end of the take-up shaft 1 is connected with the driving arrangement of the lateral pull blind. The drive is an operational component which is closed in itself and which includes a housing member 8 which is to be secured in a manner which is yet to be explained on a carrier 25 so as to be maintained in position relative to the carrier 25, a clamping winding spring 9, a driving wheel or sprocket 10 which, in the illustrated exemplary construction is constructed as a chain sprocket, as well as an entraining disc 11 which constitutes another part of the plug-in rotational entrainment connection between the driving wheel or sprocket 10 and the take-up shaft 1.

The housing member 8 which is to be stationarily mounted on the carrier 25 is provided centrally with a pin 12, on which there is arranged the clamping winding spring 9 which has a number of convolutions or turns which is chosen in accordance with the respective roll-up blind. Herein, actuating lugs 13 which extend radially beyond the convolutions are formed at the respective ends of the clamping winding spring 9.

The entraining disc 11 is mounted for rotation in the interior of the pin 12 of the housing member 8 by means of a bearing pin 14. Herein, the bearing pin 14 is composed of a plurality of pin segments 15 which are arranged at a distance from one another. The pin segments 15 are provided at their free ends with an arresting bulge 16, so that the bearing pin 14 in its totality can be arranged with a snapping engagement action in the interior of the pin 12 of the housing member 8, as may be ascertained from FIG. 2 of the drawing.

Figure 2:
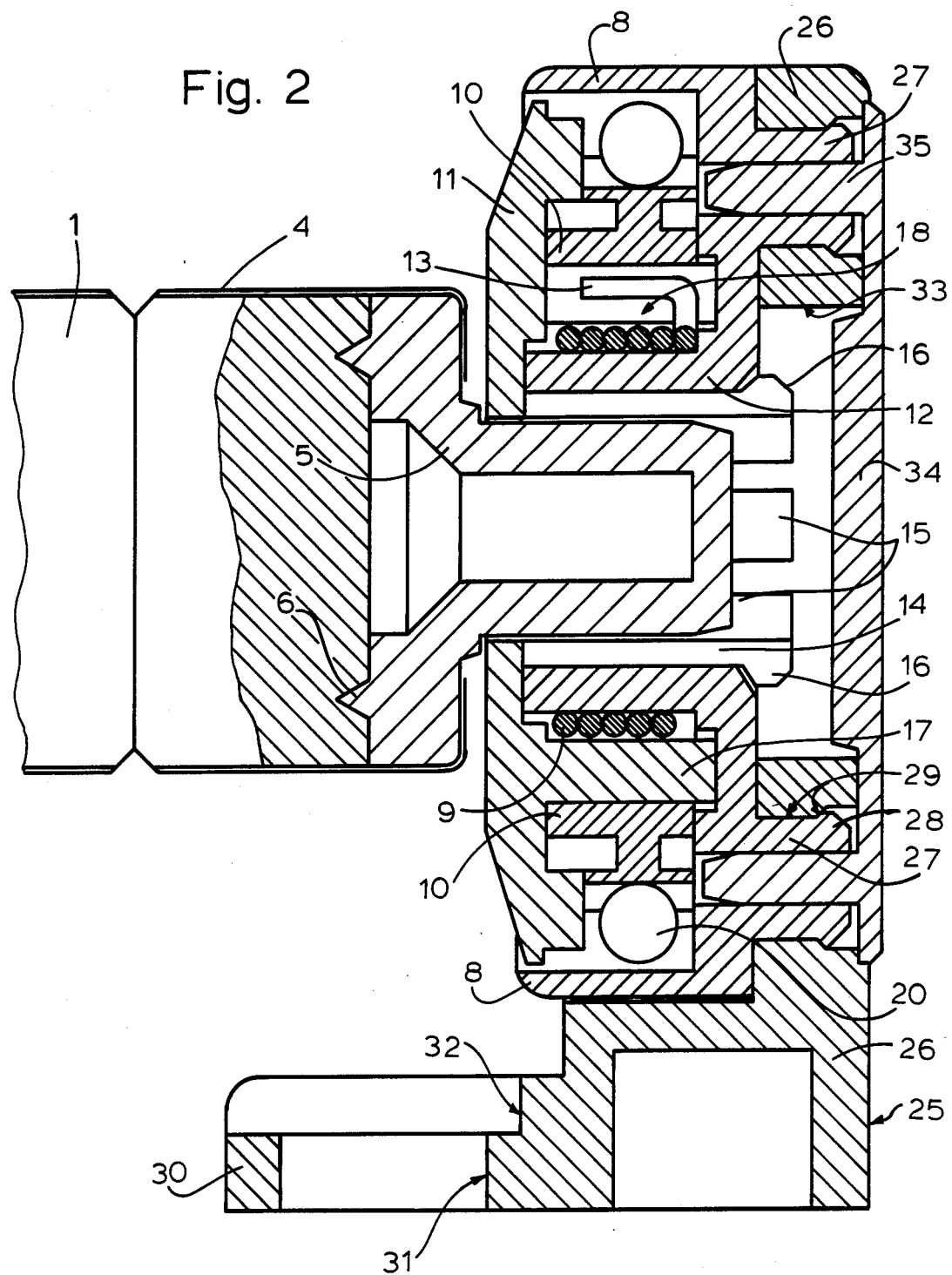
FIG. 2 is an axial sectional view of a drive of the lateral pull roll-up blind of FIG. 1 as mounted on its associated carrier and inclusive of a plugged-in entraining member connected with a take-up shaft of the arrangement.
Figure 4:
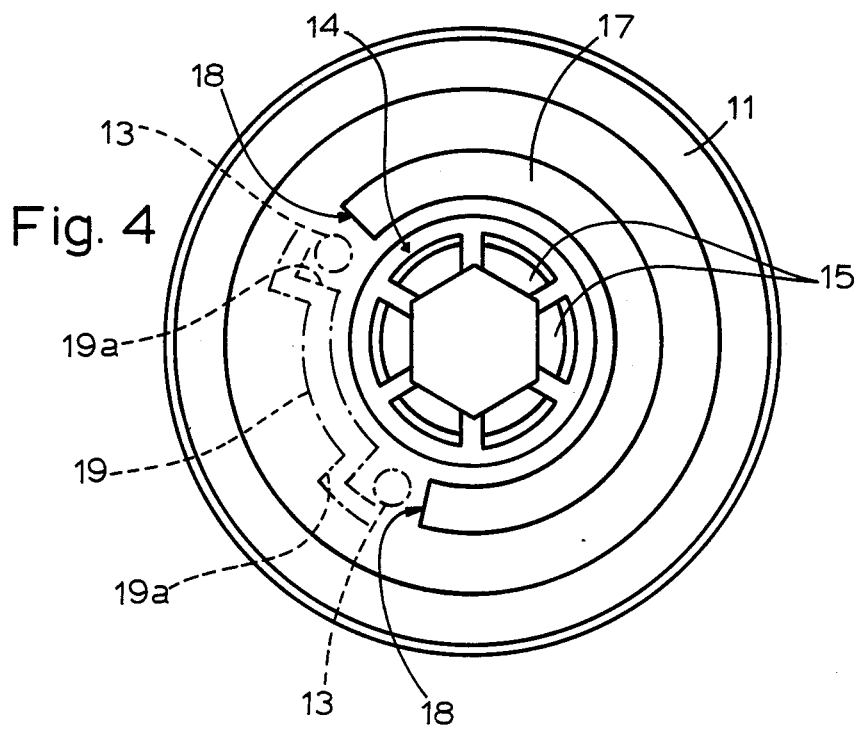
FIG. 4 is an end view of an entraining disc of a drive of the lateral pull roll-up blind of FIG. 1.
Figure 5:
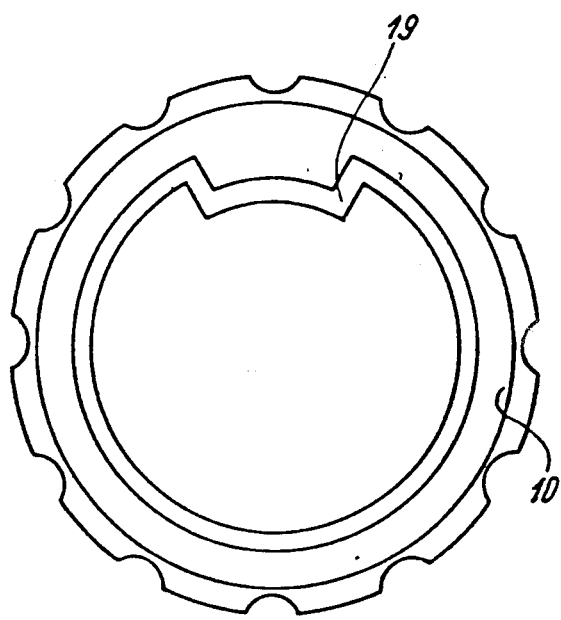
FIG. 5 is an end view of a driving wheel of the drive of the lateral pull roll-up blind of FIG. 1

The entraining disc 11 is further provided with a bearing ring 17 which upon assembly outwardly surrounds the clamping winding spring 9 having the actuating lugs 13, while the driving wheel or sprocket 10 is arranged on the bearing ring 17. As shown particularly in FIG. 4 of the drawing, the bearing ring 17 has a segment-shaped notch delineated by two abutment face 18, while a projection 19 which is also segment-shaped additionally projects from the hub body into the internal bore of the driving wheel or sprocket 10, as may be ascertained particularly from FIG. 5 of the drawing. Now, the arrangement is made in such a manner that the segment-shaped notch delineated by two abutment faces 18 of the entraining disc 11 has a circumferential dimension which exceeds the corresponding circumferential dimension of the driving wheel or sprocket 10 and that the segment-shaped projection 19 is positioned during the assembly approximately centrally of the segment-shaped notch delineated by two abutment face 18 of the entraining disc 11. As indicated especially in FIG. 4 of the drawing, one or the other of the actuating lugs 13 of the clamping winding spring 9 is arranged at the respective sides of the projection 19 so that, during the turning of the driving wheel 10 by means of a bead string 20 which is indicated in FIG. 2 of the drawing and which is trained about and engages in recesses of the driving wheel or sprocket 10 in either one of the turning directions or senses, the clamping winding spring 9 is initially loosened and thus disengaged from the pin 12 of the housing member 8, and subsequently the corresponding side of delimiting face 192 of the projection 19 of the driving wheel or sprocket 10 acts through the intermediary of the associated actuating lug 13 on a respective lateral abutment surface 18 of the bearing ring 17 of the entraining disc 11, which is formed by the notch 18, so that the entraining disc 11 is entrained for joint turning with the driving wheel or sprocket 10. In this manner of construction a continuous or stepless adjustment of the position of the roll-up blind is obtained.

The bearing pin 14 of the entraining disc 11 is, in turn, so constructed as to be hollow and has a cross-sectionally non-circular configuration corresponding or complementary to that of the entraining member 5 to constitute a plug-in receptacle for the entraining member 5 at the corresponding end of the take-up shaft 1. In this manner, the take-up shaft 1 is rotated through the intermediary of the entraining disc 11 and the entraining member 5 in one of the directions or senses of rotation. As soon as the pulling action on the bead string 20 is discontinued, the clamping winding spring 9 lockingly clamps the pin 12 and, by means of the actuating lug 13, prevents the entraining disc 11 and thus the take-up shaft 1 from further rotation.

The foregoing description shows that by resorting to the present invention, there is provided a system which performs all of the functions required from the lateral pull roll-up blind of this type with the lowest imaginable number of simple parts.

In the case of need or if preferred, the driving wheel 10 can also be constructed as a rope wheel or pulley which is then partially surrounded by a rope. The rope may then be provided, without encountering any difficulty, with a rope tensioning element which may even be sturdily dimensioned as far as its weight is concerned.

It also follows from the foregoing explanation that the dimensions of the wheel 10 may be such that it, for all intents and purposes, utilizes the entire available volume of the inner space of the housing member 8 so that, while taking into consideration the spatial conditions, a relatively large driving wheel 10 can be used. As a result of this, even heavy and wide roll-up blinds can be operated with a relatively small pulling force.

Figure 3:
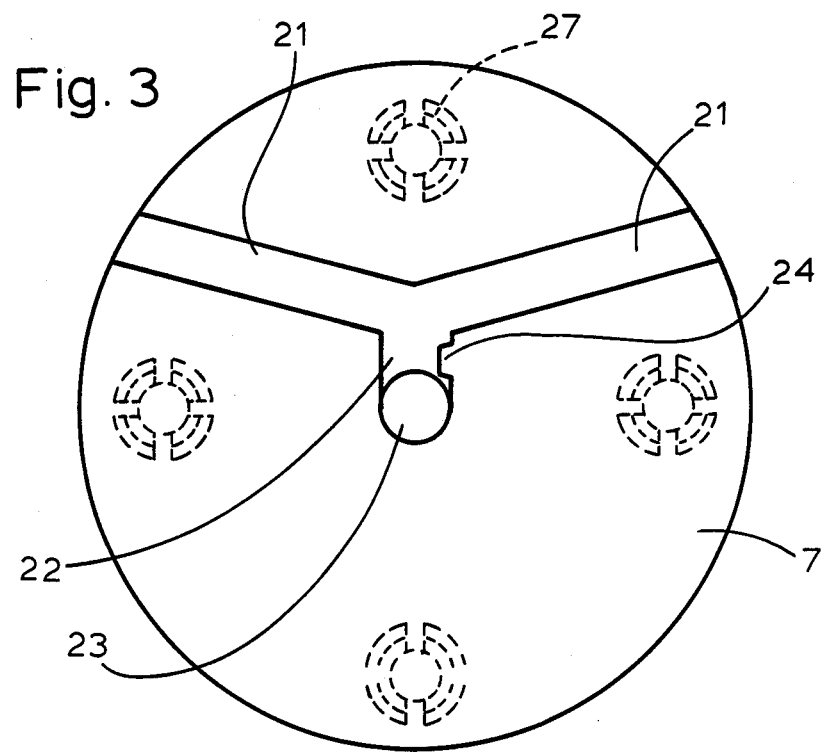
FIG. 3 is an end view of an aperture member of the lateral pull roll-up blind of FIG. 1.

The aperture member 7 which receives the end pin 3 of the take-up shaft 1 and which is to be stationarily secured to the corresponding carrier 25 in a manner which is yet to be described has a special contouring for the introduction and the reception of the end pin 3. As may be seen in FIG. 3 of the drawing, there are provided in the aperture member 7 at the side thereof which faces toward the take-up shaft 1 in the mounted position of the latter, commencing at the outer circumferential surface of the aperture member 7, two inclined slots 21 which extend toward and into each other as they approach a central region of the aperture member 7. A small radial slot 22 extends from a region of merger of the inclined slots 21 to a bearing bore 23 for the end pin 3, which is arranged substantially centrally of the aperture member 7. The position of the end pin 3 in the bearing bore 23 is herein secured by a small retention bead 24 which projects into the radial slot 22.

Owing to this construction at the ends of the take-up shaft 1, it is possible to perform mounting and dismounting operations without having to unscrew one of the carriers 25 which carry the aperture member 7 and the housing member 8, respectively. Herein, the two inclined slots 21 in the aperture member 7 also make it possible to arrange the system of the present invention during the mounting thereof extremely close to, for instance, ceilings or other upward blocking formations, as well as additionally that, in connection with the yet to be described different relative positions with respect to the carriers 25 in question, one of the inclined slots 21 is always available in a suitable position for the introduction of the end pin 3 in wall arrangements as well as in ceiling arrangements, and also in arrangements in niches.

For the stationary mounting of the housing member 8 of the drive of the lateral pull roll-up blind, as well as for the stationary mounting of the aperture member 7, on the respective one of the carriers 25, connecting formations are provided externally on the housing member 8, and more particularly within the outline of the driving wheel 10 that is accommodated within the housing member 8 in the assembled condition, and corresponding connecting formations are provided in the same manner and at corresponding locations at the exterior of the aperture member 7. Matching connecting portions for such connecting formations are then provided on respective associated carrying brackets 26. Herein, the arrangement is chosen in such a manner that the connecting formations and portions are distributed along an imaginary circle so as to render possible a multiple repositioning of the housing member 8 and of the aperture member 7 with respect to the carriers 25.

To this end, there are provided in the illustrated construction as the aforementioned connecting formations altogether four respective split plug-in and lock pins 27 with terminal bulges 28 on the corresponding external side of each of the housing member 8 and the aperture member 7, the pins 27 being distributed along an imaginary distribution circle at equal angular distances of 90° from one another. On the other hand, four snap-in receiving openings 29 are correspondingly provided in a flange 26 of each of the carriers 25, the openings 29 being also distributed along a corresponding distribution circle at 90° angular distances from one another. Owing to the repositioning possibilities offered by the equidistantly distributed pins 27 and openings 29, the lateral pull roll-up blind can be mounted with one and the same mounting system and while using the same carriers 25 at ceilings, walls or in niches. Furthermore, it is possible by using one and the same system to arrange the drive of the lateral pull roll-up blind either at the right or at the left.

In another deviation from the illustrated structural example, it is also possible to connect the housing member 8 and the aperture member 7 with the corresponding carrier flanges 26 by means of threaded fastening elements or portions. In this event, the bores for the threaded fastening elements or portions are provided with a corresponding distribution along a corresponding distribution circle.

Whether the drive is arranged at the right side or at the left side of the lateral pull roll-up blind arrangement, the drive as such remains disposed inwardly with respect to the carrier flange 26 and, consequently, it does not give an optically disturbing appearance in the completely mounted lateral pull roll-up blind.

It also contributes to the optically pleasing appearance that foot plates 30 of the carriers 25 can extend inwardly. For the securing of the carriers 25 on a wall or on a ceiling by means of screws or similar threaded fasteners, elongated slots 31 are provided in accordance with an advantageous feature of the present invention in the foot plates 30, so that a fine adjustment of the distance of the two carriers from one another can be achieved during the mounting of the lateral pull roll-up blind in an unproblematical manner. Screw head recesses or countersinks 32 are further provided in the foot plate 30, so that the heads of the connecting or mounting screws do not project beyond the foot plates 30 in an optically disturbing manner.

For the sake of completeness, it is further to be mentioned that the housing member 8 is provided in its circumferential wall with the customary outlet opening, 23 for the passage of the pulling element, in the illustrated construction of the two runs of the bead string 20, therethrough.

As may further be seen in FIGS. 1 and 2 of the drawing, the carrier flange 26 of each of the carriers 25 advantageously has a relatively large mounting opening 33. The mounting openings 33 can be closed by respective lids 34. In the illustrated construction, each of the lids 34 is provided with four insert pins 35. Herein, the plug-in and arresting pins 27 of the aperture member 7 and of the housing member 8 are constructed as hollow parts which, on their part, receive the insert pins 35 of the respective lids 34.

While the present invention has been described and illustrated herein as embodied in a specific construction of a lateral pull roll-up blind arrangement, it is not limited to the details of this particular construction, since various modifications and structural changes are possible and contemplated by the present invention. Thus, the scope of the present invention will be determined exclusively by the appended claims.

What is claimed is:

1. An elongated lateral pull roll-up blind connectable comprising
    two carriers forming respective end portions thereof,
    an aperture member cooperating with one of said carriers;
    a take-up shaft;
    a drive including
        a driving wheel;
        an elongated, pulling element entrained about said driving wheel;
        a housing member having an internal space for receiving said driving wheel and being formed with outlet openings for the passage of said pulling element,
        an end face facing in the direction of said aperture member and
        a pin extending from the remainder of said housing oppositely to said direction, so as to face the other of said carriers;
    said aperture member supporting an end of said take-up shaft facing said one of said carriers, said aperture member also having an end face;
    means for respectively releasably mounting one and the other of said housing and aperture members on one and the other of said carriers, including
    first connecting formations provided at said end faces of said members, and
    second connecting formations compatibly engageable with said first connecting formations provided at said carriers,
    said first and second connecting formations being distributed at respective equal angular distances each along respective distribution circles of said member which are commensurate with other distribution circles of said carriers and are situated within the outline of said driving wheel at said housing member for connecting said members with said carriers against displacement relative thereto about the axes of the respective distribution circles in a number of different angular positions corresponding to the distribution of said connecting formations;
    clamping means relesable by pulling on said pulling element and including a clamping winding spring arranged around said pin of said housing member to releasably engage the same and having actuating portions; and
    plug-in entrainment means for releasably connecting said driving wheel with said take-up shaft, including an entraining disc connected to the other end of said take-up shaft for joint rotation therewith, rotatably mounted on said pin of said housing member, and drivingly connected with said driving wheel through said actuating portions of said spring,
    whereby said carriers can be mounted in installation locations extremely close to walls, ceilings, other upright blocking arrangements and in niches, particularly so as to be free of any moving part between a one of the carriers and the corresponding installation location, while said drive can be located either on the right or on the left of said roll-up blind, and said drive and said take-up shaft can be relpaced without having to dismount said carriers from said installation locations.

2. The lateral pull roll-up blind defined in claim 1, wherein said pin of said housing member bounds an internal bore; and wherein said entraining disc has a disc portion and a bearing pin which rotatably mounts said disc portion in said bore of said pin of said housing member and which is constituted by a plurality of individual segments that have free ends remote from said disc portion and provided with respective bulges for snap-action arresting in said pin of said housing member.

3. The lateral pull roll-up blind as defined in claim 2, wherein said entraining means further includes an entraining member secured to said other end of said take-up shaft and having at least a portion with a non-circular cross section; and wherein said bearing pin of said entraining disc bounds an internal passage having a non-circular cross-section corresponding to that of said portion of said entraining member for receiving the latter.

4. The lateral pull roll-up blind as defined in claim 3, wherein said entraining member has an end surface which faces said one end of said take-up shaft, and a toothing on said end surface which engages in said one end of said take-up shaft.

5. The lateral pull roll-up blind as defined in claim 1, wherein said clamping winding spring has a coil portion having two ends each carrying one of said actuating portions; wherein said entraining disc includes a bearing ring which carries said driving wheel, surrounds said coil portion of said spring, and has a segment-shaped notch delimited by two abutment surfaces which delimit respective interspaces with said abutment surfaces; wherein said driving wheel has a segment-shaped projection which is received in said notch of said bearing ring and has two delimiting faces which are circumferentially spaced from one another by a distance smaller than the corresponding circumferential distance separating said abutment surfaces of said bearing ring; and wherein each of said actuating portions of said spring extends into a different one of said interspaces.

6. The lateral pull roll-up blind as defined in claim 1, further comprising an end pin secured to said one end of said take-up shaft; and wherein said aperture member has a circumferential surface, and a side which faces toward said take-up shaft in the mounted position of the latter and is provided for the mounting and dismounting of said end pin with a substantially centrally situated bearing bore for the end pin, two inclined slots which extend from said circumferential surface toward and merge with each other at a centrally located merger region radially offset from said bearing bore, and a radial slot extending from said merger region to said bearing bore.

7. The lateral pull roll-up blind as defined in claim 6, wherein said aperture member further includes a retaining bead in said radial slot for retaining said end pin in said bearing bore.

8. The lateral pull roll-up blind as defined in claim 1, wherein said equal angular distances between said first and second connecting formations which are provided along the respective distribution circles on said housing and aperture members and on said carriers, respectively, amount substantially to 90°.

9. The lateral pull roll-up blind as defined in claim 1, wherein said carriers have respective carrier flanges; wherein said first connecting formations are constituted by plug-in arresting pins provided externally on said housing and aperture members; and wherein said second connecting formations are constituted by arresting recesses provided in said carrier flanges of said carriers.

10. The lateral pull roll-up blind as defined in claim 1, wherein said carriers further have respective foot flanges having elongated slots for the reception of respective stems of mounting screws, and countersinks at said slots for receiving respective heads of the mounting screws.

11. The lateral pull roll-up blind as defined in claim 1, wherein said carriers have respective carrier flanges each of which has a central mounting opening; and further comprising respective lids for closing said openings.

12. The lateral pull roll-up blind as defined in claim 11, wherein said first connecting formations are constituted by hollow plug-in arresting pins provided externally on said housing and aperture members; wherein said second connecting formations are constituted by through arresting recesses provided in said carrier flanges of said carriers; and wherein said lids have respective plug-in pins which are received in said hollow plug-in arresting pins of said housing and aperture members.

13. An elongated lateral pull roll-up blind using only a minimum number of interchangeable connectable parts compared to that of similar prior art comprising
two carriers forming respective end portions thereof,
an aperture member cooperating with one of said carriers,
a drive including
a take-up shaft;
a driving wheel;
an elongated, pulling ellement trained about said driving wheel;
a housing member having an internal space for receiving said driving wheel, and being formed with outlet openings for the passage of said pulling element,
an end face facing in the direction of said aperture member, and
a pin extending from the remainder of said housing oppositely to said direction, so as to face the other of said carriers;
said aperture member supporting an end of said take-up shaft facing said one of said carriers, said aperture member also having an end face;
means for respectively releasably mounting one and the other of said housing and aperture members on one and the other of said carriers, including
first connecting formations provided at said end faces of said members, and
second connecting formations compatibly engageable with said first connecting formations provided at said carriers,
said first and second connecting formations being distributed at respective equal angular distances each along respective distribution circles of said member which are commensurate with other distribution circles of said carriers and are situated within the outline of said driving wheel at said housing member for connecting said members with said carriers against angular displacement relative thereto about the axes of the respective distribution circles in a number of different angular positions corresponding to the distribution of said connecting formations;
clamping means releasable by pulling on said pulling element and including a clamping winding spring arranged around said pin of said housing member to releasably engage the same and having actuating portions; and
plug-in entrainment means for releasably connecting said driving wheel with said take-up shaft, including an entraining disc connected to the other end of said take-up shaft for joint rotation therewith, rotatably mounted on said pin of said housing member, and drivingly connected with said driving wheel through said actuating portions of said spring,
wherein said pin of said housing member bounds an internal bore; and
wherein said entraining disc has a disc portion and a bearing pin which rotatably mounts said disc portion in said bore of said pin of said housing member, and which is constituted by a plurality of individual segments that have free ends remote from said disc portion and provided with respective bulges for snap-action arresting in said pin of said housing member, whereby said carriers can be mounted in installation locations extremely close to walls, ceilings, other upright blocking arrangements and in niches, but said drive can be located either on the right or on the left of said roll-up blind, and said drive and said take-up shaft can be replaced without having to dismount said carriers from said installation locations.

* * * * *